Feb. 21, 1939. M. BARUCH ET AL Re. 21,005

AUTOMATIC STOPPING ELEVATOR CONTROL SYSTEM

Original Filed Nov. 16, 1925 5 Sheets-Sheet 1

WITNESSES:
E. A. McCloskey
Birney Hines

INVENTORS
Milton Baruch,
Ray E. De Camp
and Cranford P. Walker.
BY
ATTORNEY

Feb. 21, 1939. M. BARUCH ET AL Re. 21,005

AUTOMATIC STOPPING ELEVATOR CONTROL SYSTEM

Original Filed Nov. 16, 1925 5 Sheets-Sheet 2

WITNESSES:

E. A. McCloskey.

Birney Hines

INVENTORS

Milton Baruch,
Ray E. De Camp
and Cranford P. Walker.

BY

ATTORNEY

AUTOMATIC STOPPING ELEVATOR CONTROL SYSTEM

Original Filed Nov. 16, 1925 5 Sheets-Sheet 3

WITNESSES:
E. A. McCloskey.
Birney Hines

INVENTORS
Milton Baruch,
Ray E. De Comp
and Cranford P. Walker.
BY
ATTORNEY

Feb. 21, 1939. M. BARUCH ET AL Re. 21,005

AUTOMATIC STOPPING ELEVATOR CONTROL SYSTEM

Original Filed Nov. 16, 1925 5 Sheets-Sheet 4

WITNESSES:
E. A. McCloskey
Birney Hines

INVENTORS
Milton Baruch,
Ray E. De Camp
and Cranford P. Walker.
BY
M. Baruch
ATTORNEY Feb. 21, 1939. M. BARUCH ET AL Re. 21,005

AUTOMATIC STOPPING ELEVATOR CONTROL SYSTEM

Original Filed Nov. 16, 1925 5 Sheets-Sheet 5

WITNESSES:
E. A. McCleskey
Birney Hines

INVENTORS
Milton Baruch,
Ray E. De Camp
and Cranford P. Walker.
BY
ATTORNEY

Reissued Feb. 21, 1939

Re. 21,005

UNITED STATES PATENT OFFICE 21,005

AUTOMATIC STOPPING ELEVATOR CONTROL SYSTEM

Milton Baruch, Los Angeles, Ray E. De Camp, Glendale, and Cranford P. Walker, Los Angeles, Calif., assignors, by mesne assignments, to Westinghouse Electric Elevator Company Original No. 1,895,065, dated January 24, 1933, Serial No. 69,353, November 16, 1925. Application for reissue February 26, 1937, Serial No. 127,944

13 Claims. (Cl. 187—29)

This invention relates to elevators, and refers particularly to electric hoisting mechanisms for elevators provided with electric control means for bringing the car to a stop level with a floor landing.

An object of the present invention is to provide an elevator, particularly a high-speed elevator, with automatic means for slowing the car down and stopping the same as well as automatic means for accurately leveling the car with a landing. Hitherto, high-speed elevators, such for example, as travel 600 feet per minute, have generally been stopped by the manual control of an operator's switch within the car. This for the reason that an elevator traveling 600 feet a minute requires about eight feet in which to stop with comfort to the passengers within the car. The distance between adjacent floors is usually from ten to twelve feet, and accordingly, if mechanism is provided for automatically stopping the car when it comes within a predetermined distance or within the necessary stopping zone of the landing, the mechanism will be interfered with by stopping zones of adjacent landings overlapping. Thus high-speed elevators have generally employed manual means for stopping the cars.

Another object of the present invention is to provide an electric elevator and a control mechanism for the elevator by which the elevator car may be brought accurately to a level with the desired landing, by which both the slowing down and the stopping of the car is automatic, and in which such stopping and slowing of the car will take place with a minimum loss of time and maximum comfort to the passengers. By the control mechanism herein described, automatic slowing down of the car and the accurate leveling of the car with a landing takes place without any accompanying jerking of the car.

Another object of the present invention is to provide an electric elevator control mechanism by which the doors of the car of the elevator may be automatically opened during that period in the operation of the elevator car in which the automatic accurate leveling of the car with a landing takes place—thus increasing the speed of the elevator service.

In order to provide for both an accurate leveling of a car with a landing and an automatic stopping of the elevator, the elevator of the present invention is provided with electric control mechanism which is operated by push buttons within the car—one for each of the different landings. These push buttons may be set at any time and can then be re-set either manually at any time and are re-set automatically at the top and bottom landings. They connect with automatic mechanism so that the car is first automatically decelerated on approaching landings corresponding to the buttons pressed, and the elevator is then brought accurately to the level with the landing. In addition to the car push buttons or signaling means, there are provided signaling means or up and down buttons at the various landings, the operation of which will stop the next approaching car at the landing at which the button is pressed. The starting of the car is governed by an operator within the car.

Another object of the present invention is to provide a self-leveling elevator in which the leveling is effected in a novel manner and by novel means operative to effect the desired leveling without jerking of the car, and without the necessity of employing more than a single elevator driving device.

Another object of the present invention is to provide a control means for an accurate leveling elevator capable of accurately leveling the car with a landing, which control means can be disposed entirely inside of the elevator well or hoistway and in the customary elevator penthouse. Thus the present invention provides an improved form of "floor controller", that is, a device for controlling the movement of the car and placed apart from the elevator well and driven by a connection either from the electric driving motor or the car, and the floor controller of the present invention is adapted for accurate and proper operation of the car without the necessity of employing correcting means between the floor controller and car, due to the improved character of electrical driving and controlling means for the car, which, through smoothness of operation prevents jerking of the car and thus dis-alignment of the floor controller and car.

Various other features, advantages and objects of the invention will be apparent from a description of a preferred form of elevator embodying the invention, for which purpose reference is made to the accompanying drawings, in which.

Figure 1:
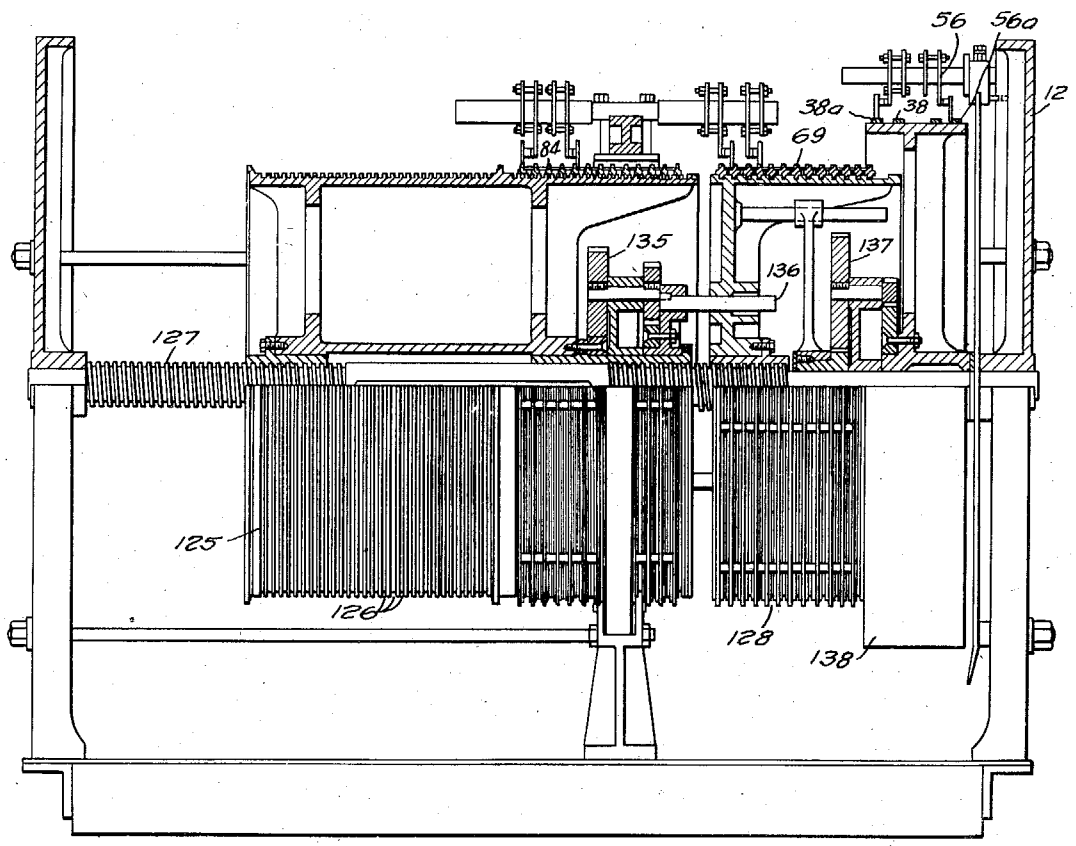
Figure 1 is a side elevation partially in vertical section, of the floor controller forming part of the car controlling mechanism.

In the drawings, the elevator is there illustrated as provided with electric control means permitting the elevator car to serve four floors. The system is also illustrated as one unit of the multiple car elevator system, for each of which cars there are provided control means similar to that illustrated for the car disclosed, the different control means for the various cars being connected as indicated. The different mechanisms or elements of the apparatus are shown in the diagram as in the position they would be when the car was at the third landing.

In the drawings, 2 indicates an elevator car provided with an operator's switch handle 3 within the car, which switch handle as is usual, is intended to be moved in one direction to cause up motion of the car, and in the other direction to cause down motion of the car, and has a neutral or central position. Such switch handle 3 is provided with a latch 4 by which it may be latched in the neutral position.

The elevator car is driven or operated by an electric hoisting motor 5 of any preferred or customary construction, which electric motor is preferably energized by a generator 6 of a motor generator set including the driving motor 7 and the exciter 8. The control of the operation of the elevator car is effected through control of the supply of current from exciter 8 to the fields of the generator. 9 indicates the usual shunt field of the generator 6. The generator 6 is, in addition, supplied with a second field 10, which consists of a winding of relatively few turns. The generator field 9 will be hereinafter referred to generally as a high-speed generator field since it is energized when it is desired to operate the car at high speeds, and the generator field 10 will be termed a slow-speed field, inasmuch as it is employed during the slowing down of the car and having relatively few turns will give a quick dying down of the field during part of the operation of stopping the car at a floor landing.

The exciter 8, in addition to supplying current to the generator fields and the motor shunt field 11, provides mains $L^1$ and $L^2$ which supply the current for operation of all of the control mechanism. The signalling mechanism of the elevator system may be supplied with power from this exciter but is preferably supplied by a separated source as indicated by the switch 160 for connecting the mains $x$ and $y$.

Figure 2:
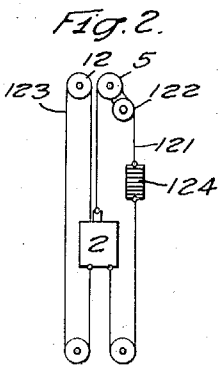
Fig. 2 is a diagram of the mechanical connection between the car electric hoisting motor and floor controller.

The control mechanism of the car preferably but not necessarily includes mechanically operated switching mechanism all of which is preferably included in a floor controller 12 (Fig. 1) which is driven with the car 2. Thus all of the mechanical operating parts of the car controlling system may be located outside of the elevator well. The mechanical connection between the car and floor controller 12 is shown in Fig. 2 while the electrical control of the car by the floor controller is best understood from a description of the electrical mechanism of Figs. 3 and 4.

The car 2 is shown as mounted on cables 121 driven by motor 5 and balanced by a weight 124. A second set of cables 123 connect the floor controller 12 to drive the floor controller 12 with the car 2.

The floor controller 12 comprises a drum 125 having a part of its drum surface provided with a spiral cable receiving grooves 126 which receive the driven cable 123 and having a second part of its drum surface mounting cams 84 for operating a car stopping and leveling switching mechanism. One of the cams 84 is provided for each floor or landing at which the car stops as later more particularly pointed out in connection with the description of the operation of the car. The cams 84 are intended to engage roller stopping and leveling switches 80, 81, 82 and 83 to stop and accurately level the car 2 with the different landings. The particular character of the cams and the function of the four stopping and leveling switches will be readily understood from the electrical diagram of Figs. 3 and 4 in which a development of the several cams and switches of the floor controller 12 is shown. The stopping and leveling drum 125 is advanced axially during motion of car 2 by a screw-threaded drive 127, the cams 84 being thus spirally disposed on the drum surface to maintain themselves in contact to the leveling and stopping switches 80 to 83 which are held in fixed position.

The floor controller 12 is provided with a second drum 128 which serves to provide a travelling drum surface for cams of an automatic car slow down or car decelerating switching mechanism. This decelerating or slow-down drum 128 is provided with two different sets of cams operating two different sets of roller switches, one set of switches being provided for operation at even numbered floors and one set of cams and switches being provided for operation at odd numbered floors. The odd set of slow-down switches includes the switches 64, 65 and 66 which operate when the car is driven upward and the group of switches 118, 119 and 120 which operate when the car is descending; while the even set of decelerating slow-down switches includes the group of up-switches 129, 130 and 131 which operate at even floors when the car is traveling upward and the group of down-switches 132, 133 and 134 which operate at even floors when the car is descending. A different cam is provided on the slow-down drum for each floor, the odd numbered cams being arranged in one series and the even numbered cams in another series.

The division into the slow-down switching mechanism of the two parts is to prevent the overlapping of the cam surfaces for the different floors which would otherwise take place.

The slow-down drum 128 is driven by the stopping and leveling drum 125 preferably so that it revolves only at half-speed to that of the drum 125, 135 indicating a reduction gearing, connecting the drum 125 with the drum 128 by sliding drive 136.

137 indicates a further set of reducing gearing for driving a master drum 138. This master drum is provided with an up-cam 38 and a down-cam 38a which respectively engaged the up-series of master cam switches 40, 41, 42 and 43 and the down master cam-switches 110, 111, 112 and 113, there thus being one up-master cam switch and one down master cam-switch for each landing.

These switches operate to selectively cause the car slowing and stopping switching mechanisms to be set in operation in accordance with signals from car or hall push buttons as later described.

In addition to the master cams and switches, the master-drum also mounts an up-cam 56 and a down-cam 56ᵃ which cams respectively engage with the up-group of interlocking switches 57, 58, 59 and 60 and the down-group of interlocking switches 114, 115, 116 and 117. These switches are for interlocking with the separate sets of decelerating or slow-down switching mechanism as the different operations of the car require.

Elevator control mechanism will be most readily understood from a description of the operation of the elevator car, and for this purpose the operation of the car will now be described, it being assumed that the car is at the first landing, at rest, and with the elevator car door open. The elevator car is provided with a bank of push button switches or signalling means $1^f$, $2^f$, $3^f$ and $4^f$ which correspond to the different floors at which the elevator stops, such switches having means for mechanically latching the same in the closed position. As soon as the passengers enter the car 2 or at any time during the operation of the car, the push buttons $1^f$ to $4^f$ respectively may be pushed in order to select or determine the floor or floors at which the elevator car will stop during its upward travel. For example, supposing that the push button $3^f$ is pressed in, this connects line $C^3$ to exciter main X which line $C^3$ passes to certain switches upon the floor controller 12, as will later be pointed out, conditioning said floor controller to automatically stop the car at the third floor.

When the operator desires to start the car he presses the latch 4 on the car switch handle 3. This unlatches mechanically the car switch handle 3 and also closes a circuit from exciter main $L^1$ to the line DT. This establishes a circuit through the coil of a door opening relay 13 which in turn closes a circuit for closing the door of the car. This door closing circuit may be traced from exciter main $L^1$ through contact 14 of the door closing relay 13, through right hand coil 15 of an air-valve-operating magnet 16, contact 17 of such air valve operating magnet, to main $L^2$. This rocks armature 162 of air valve 163 to right, breaking contact 17 and closing contact 20.

The operation of the latch 4 of the car of the operator's switch handle 3 also closes a circuit through a reset relay 18 (traced from main $L^1$, latch switch to line DT, through coil of relay 18, and closed back contacts of relays 24 and 23 to main $L^2$) which, as will be later pointed out, breaks all retaining circuits which have been set up during previous operations of stopping and leveling the car with the first landing.

Figure 3:
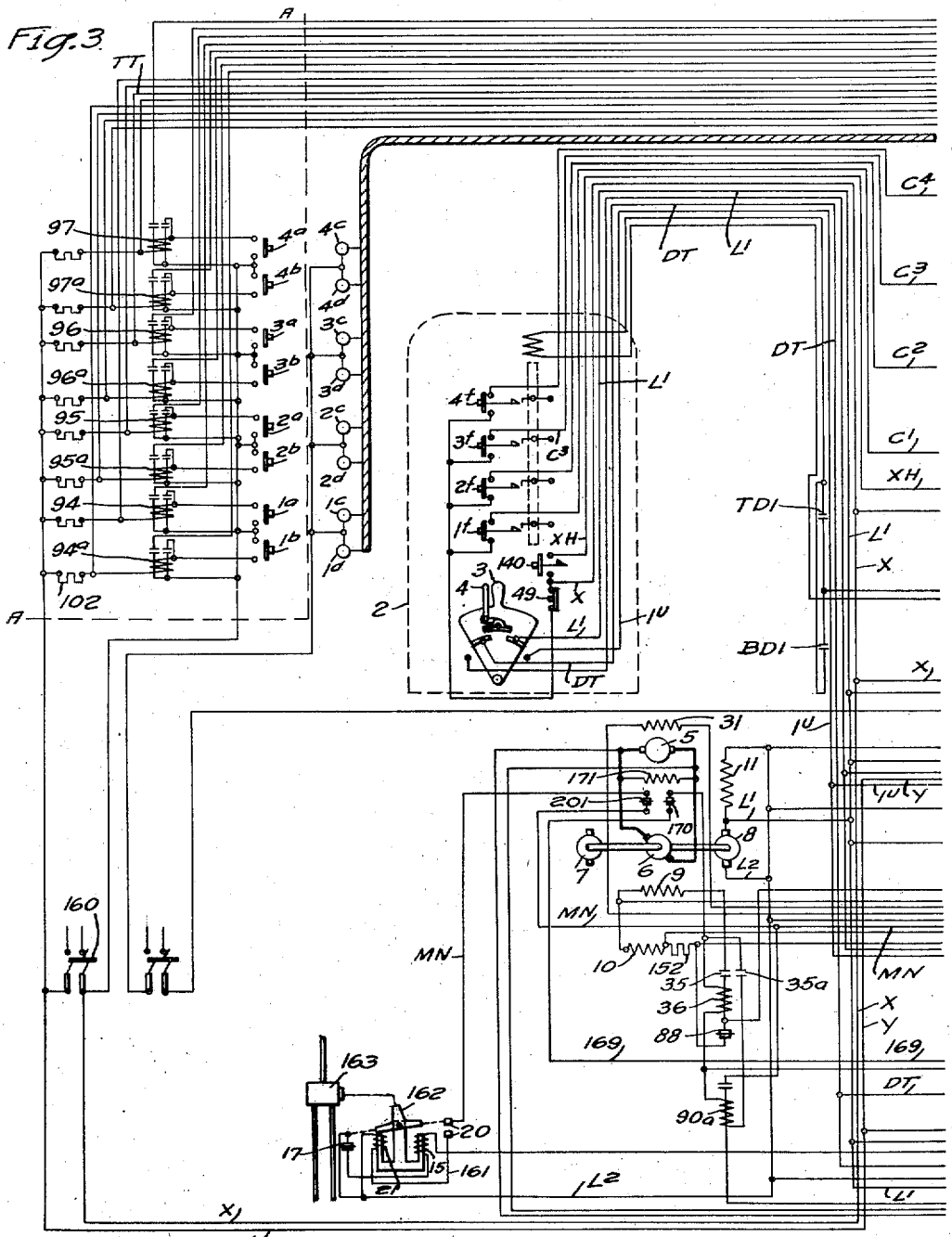
Figs. 3 and 4 are an electrical diagram of the system showing a development of the cam surfaces, the electrical diagram being indicated as cut in two with Fig. 3 forming the left hand part and Fig. 4 the right hand part.

In case the latch 4 was again actuated to latch the handle 3 in the neutral position, this operation would in turn close a circuit for automatically opening the door of the car, since supply of current to the coil of the door closing relay 13 would be broken and hence contact 14 of the door closing relay 13 would be thereby opened and back contact 19 in consequence closed, thereby establishing a circuit from main $L^1$ through contact 19, line MN, contact 156*b*, contact 201, contact 20 of air valve operating magnet, through a second coil 21 of the air valve operating magnet to main $L^2$, rocking the armature 162 back to the position shown in Figure 3, breaking contact 20 and closing again contact 17. This circuit is also made to include a contact 156*b* (in line MN) of a door locking relay 22 which, as will be later pointed out, operates during motion of the car to prevent opening of the car doors.

After the latch 4 is pressed to release the operating handle 3 said handle may be moved in the right-hand direction, as viewed in Fig. 3, which will then cause the car to travel upwardly. For this purpose, the operating handle connects line 1U to the main $L^1$ which leads through the coil of an up master relay 23 and through the coil of the door locking relay 22 to main $L^2$. The door opening circuit is thereby opened and the door of the car may not then be opened.

In addition to the up master relay, there is provided a down master relay 24 which it is understood would be in place actuated if the operator's handle had been moved in the opposite direction and in the following description of apparatus it will be understood that in place of the operations of the different up relays and up switches, the correspondingly denominated down relays or switches would then be actuated in substantially similar manner.

The energizing of the coil of the up master relay 23 closes a circuit through its contact 25 through coil of an up-direction switch or relay 26, 27 indicating a corresponding down-direction switch. This circuit also includes the coil of an up-retaining relay 28, 29 indicating a corresponding down retaining relay. The circuit also passes through the coil of a brake controlling relay 30. The circuit is main $L^1$, contact 25, coil of relay 26, coil of relay 28, coil of relay 30 to main $L^2$. The closing of the brake controlling relay releases a brake from the elevator car by closing a circuit through the usual brake coil 31 thereof. This circuit leads from main $L^2$, right-hand contact relay 30, through coil 31 to left-hand contact relay 30 to main $L^1$. The closing of up-direction switch 26 closes a circuit through the high-speed field 9 of the generator and the car starts up at full speed. This first circuit for the generator field may be traced from main $L^1$ through a back contact 32 of an automatic slow-down relay 33 (the purpose of which will be later pointed out) through contact 34 of the direction switch 26 through a contact 35 of a relay 36 through the high-speed winding 9 and contact 37 of the up-direction switch 26 to main $L^2$.

At the same time a holding circuit is closed by the left-hand contact of the up-holding circuit relay 28 which circuit operates to maintain the direction relay 26 closed and also maintains the up-master relay 23 closed by providing a connection between main $L^1$ and line 1U other than that provided by the switch 3. This connection is from exciter main $L^1$, through contact of a relay 79, contact of relay 28 to line 1U. The car switch 3 may then be centered without effecting the travel of the car.

The car travels upward until it reaches a predetermined distance from the third floor landing, this distance being made preferably substantially the minimum distance that the car 2 can be slowed down to stop at the landing with comfort to the passengers, and by causing the car to travel at full speed to such point, the speed of service is increased over that at which an operator could manually slow down the car, since an operator is invariably required to prematurely slow down the car in bringing the car to a level with a landing. At the time that the car arrives at this predetermined point, the up-cam 38 on a master drum 138 of the floor controller 12 rotates into engagement with switch 42, one of a series of the up-master roller switches 40, 41, 42 and 43 which are provided in sufficient numbers to correspond to the floors served by the elevator car. Each of these switches makes, on engaging the cam 38, two contacts, one of which connects switches 40 to 43 respectively to the car push buttons $1^f$ to $4^f$ respectively, the other contacts of the switches connecting the same with hall signals as later described. The contacts carried by the arms of switches 40, 41, 42 and 43 have previously been rendered alive to Y potential by closing of the up-master relay 23, as before described. Circuits from the switches 40 to 43 inclusive, respectively, for connecting the car buttons $1^f$ to $4^f$, respectively, are as follows, main Y right-hand upper contact 48 of up-master relay 23, line Yc to contacts 40 to 43 respectively. The right-hand stationary contacts of switches 40, 41, 42 and 43 are connected by lines $c^1$, $c^2$, $c^3$ and $c^4$, respectively, which includes coils 44, 45, 46, 47, respectively, of relays and connect with switches $1^f$, $2^f$, $3^f$, and $4^f$, respectively. If the switches $1^f$ to $4^f$ inclusive are connected through switch 49 to the main X, hence, if any one or any number of the switches $1^f$ to $4^f$, respectively, are closed, a circuit from main X to main Y is established, closing relays 44, 45, 46 or 47, respectively. 110, 111, 112 and 113 indicate down master roller switches which operate when the car is descending.

As above stated, car push button $3^f$ being latched in, the cam 38 engages switch 42 to close a circuit which energizes a relay 46 of a series of car signal relays 44, 45, 46 and 47 which are similarly connected to the up master roller switches 40, 41, 42 and 43 respectively, and down master roller switches 110, 111, 112 and 113 respectively. The circuit for closing the coil of relay 46 may be traced from main Y, contact 48 of the up master relay, right-hand contact of switch 42, coil of relay 46, car push button switch $3^f$, switch 49, to main X. 49 is a switch in the car for opening circuits to the car signals for by-passing the signals when desired.

The closing of relay 46 in turn closes a circuit through the coil of car signal master relay 50. This circuit leading from main X through contact of the reset relay 18, coil of relay 50 and right had contact of relay 46 to main X. The energizing of coil of master relay 50 in turn closes a circuit from main X through its contact 51, its coil, and contact of retaining relay 18 to main Y, for automatically retaining the master relay 50 closed. A contact 52 of the master relay 50 simultaneously closes a circuit from main $L^1$ through the coil of the automatic slowdown relay 33 to main $L^2$ which relay 33 operates, by breaking its back contact 32 in the primary generator field circuit, to break such circuit and simultaneously closes instead a second circuit for the generator as follows—main $L^1$ through contact 53 of relay 33, resistance 54, contact 34 of direction relay 26, contact 35 of generator field relay 36, high-speed field 9, contact 37 of direction relay 26, and main $L^2$. The resistance 54, however, at this time is shorted, on account of the simultaneous operation of the slow down switching mechanism. The elevator thus is still proceeding at full speed.

The resistance 54 has been shorted due to the up-cam 56 upon the master drum engaging roller operated switch 59 of the up interlocking switches 57, 58, 59 and 60, which are respectively operated when the car is stopping at floors 1, 2, 3 and 4 respectively. Down interlocking switches 114, 115, 116 and 117 operate at corresponding periods when the car is descending. The switch 59 closes the upper coil of one of two relays 62 and 63, mechanically interlocked by a bar 63a, the current passing from main Y through contact 48 of the up car master relay 23, contact of cam operated switch 59, and coil of switch 62 to main X. The interlocking relays 62 and 63 are for the purpose of determining which of two sets of slow-down switches will be operated. The energizing of the coil 62 as described, closes contacts of relay 62 which thereby excites line LS to potential $L^2$ of the exciter through contact 61 of the automatic slow-down relay 33 and accordingly energizes up cam operated slow down switches 64, 65 and 66 of the odd set of slow-down switches. The odd set of slow switches also includes down switches 118, 119 and 120 for operation of a descending car. Moreover there is provided a separate or even set of switches operated by a different cam including the up-switches 129, 130 and 131 and the down switches 132, 133 and 134 which operate for even numbered floors. At the time cam 38 closes master roller operated switch 42, the cam 69 on slow down drum is holding all of the series of switches 64, 65, 66 closed, thereby energizing the switches 75, 76 and 77 and thus shorting the entire resistance 54.

The resistance 54 is indicated as split into a plurality of parts, each of which is under control of one of the slow down switches, for example, the closing of cam operated slow-down switch 66 shorts the lower portion of the resistance through the closing of an operating circuit from main $L^1$, contact 53 of the automatic slow down relay, through line 166 to the right hand contact 72 of the holding circuit relay, through line 167 to coil of a relay 73, contact of switch 66, coil of relay 75, contact of mechanically interlocked relay 62, contact 61 of the automatic slow-down relay, and main $L^2$. The closing of relay 75 shorts its corresponding portion of the resistance 54, relays 76 and 77 being indicated for closing the other portions of the resistance. Relays 127, 128 and 129a are indicated for shorting the resistance at even numbered floors. As the switch 65 is closed, circuit is established for shorting a second portion of the resistance of the generator field by closing relay 76 as follows, main $L^1$, contact 53 of the automatic slow down relay, contact 72 of the holding circuit relay, coil of relay 73, contact of switch 65, coil of relay 76, contact of mechanically interlocked relay 62 and contact 61 of the automatic slow down relay, and main $L^2$. Likewise, when switch 64 is closed, relay 77 closes to short the final portion of the resistance. This circuit is as follows: main $L^1$, contact 53 of the automatic slow down relay, contact 72 of the holding circuit relay, coil of relay 73, contact of switch 64, coil of relay 77, contact of mechanically interlocked relay 62, contact 61 of the automatic slow down relay, and main $L^2$.

It is thus seen that when any of the slow-down switches are covered or closed by cam 69, the relay 73 is closed. When relay 73 is closed, its back contact 87 breaks the circuits to leveling cam operated switches 80, 81, 82 and 83 which are to be engaged by the cams 84 on the stopping drum of the floor controller 12. It will be seen that previous to closing relay 73, the switches 80 to 83 inclusive have their left hand contact at $L^1$ potential, as can be traced from main $L^1$, contact 53 of relay 33, back contact $73^b$ of relay $73^a$, back contact 87 of relay 73, line 168 to left hand contact of the switches 80 to 83 inclusive.

Another parallel action set up on account of the energizing of the automatic slow down relay 33 is the energizing of the relay 79 (the coil of which is in series with contacts 53 and 61 of relay 33) which relay 79 operates to break the holding circuit for the master relay 23. Contact 25 of relay 23 on opening breaks the first holding circuit of direction relay 26, holding relay 28 and brake relay 30. However, the breaking or opening of this holding circuit for these relays transfers the holding circuit to contact of relay 73 which brings in the stopping switching mechanism. Thus a circuit is closed from main $L^1$, contact of switch 73, line RR, coil of relay 26, coil of relay 28, coil of relay 30 to main $L^2$.

Accordingly, the car continues to approach the third landing while each of the slow down switches 64, 65 and 66 are respectively being dropped off cam 69, thus smoothly decelerating the car by inserting definite resistance in the high-speed generator field circuit at points of travel of the car at fixed distances from the third landing. When the last of the slow-down switches 64, 65 and 66 are open the second holding circuit relay 73 then opens and breaks the second holding circuit for the direction relay 26, relay 28 and breaks holding relay 30. The opening of the contact of relay 73, however, through the simultaneous closing of its back contact 87, establishes a third holding circuit for direction relay 26, holding relay 28 and brake controlling relay 30 by connecting line RR to main $L^1$, through contact 53 of relay 33, contact 87, contact of car leveling switch 81, to line RR, and the direction relay is not permitted to open.

At this point in the operation, the contact of the leveling switches 80 and 81 have been closed by the cam 84 of the stopping drum, which serves the third floor preferably the cam 84 being caused to close the switch 80 slightly before cam 69 drops off the last of the slow-down switches in order to secure smooth operating conditions. The closing of stopping switch 80 closes a circuit through the generator field transferring relay 36 (Figure 3) said circuit is from left hand contact of the switch 80 which, as before explained, is alive to $L^1$ potential to right hand side and line 169 which includes back contacts of relays 75 and 127, the right hand contact 170 of a relay 171 through coil of relay 36, through line 172, right hand contact 61 of relay 33 to main $L^2$ and said relay, by breaking its contact 35 and closing its contact 88, then cuts out the high-speed generator field 9 and closes a circuit through the slow-speed generator field 10 said circuit is from main $L^1$, through contact 53 of the automatic slow down relay 33, through the resistance 54, the contact 34 of direction switch 26, contact 88, slow speed field 10, contact 37 of direction switch 26 to main $L^2$. This transferring of the generator to its slow speed field causes a quick slowing-down of the car before stopping, without, however, jerking the car, as would be effected by the appliance of mechanical brakes.

The car is quickly slowed down until slow down switch 81 is open. This breaks the holding circuit for the direction relay 26, master car relay 28 and brake relay 30, and since no other holding circuit is closed and the operator's switch 3 is not operated, these relays are opened and there is simultaneously broken the circuit to the slow speed generator field 10 and the brake coil 31 energized to apply the brakes to the car.

Normally the car is brought by the operation thus described to an exact level with the landing, and in such case no further operation of the car need take place; however, at certain abnormal loads the car may overrun the landing, in which case the stopping switches 82 and 83 come into use.

Now, assuming that the car has overrun the third floor on its up stop, then the stopping switch 82 closes a holding circuit for the down interlocking relay 29, the down direction switch 27 and brake controlling relay 30, with the result that the brake is released from the elevator car and current is supplied through the slow-speed winding to return the car again to the landing. Stop switch 82 being alive to $L^1$ potential, as before described, when it closes completes a circuit from main $L^1$ through line 173, through coil of down direction switch 27, coil of down retaining relay 29, through coil 30 of brake controlling relay to main $L^2$. This reverses the current in the slow speed field 10, to drive the car in the opposite direction, such slow speed field being now as follows: main $L^2$, through left hand contact of down switch 27, through contact 88 of relay 36, back contact 151 of relay 150, through a generator field 10, right hand contact of down switch 27, lower section of resistance 54, contact of relay 76, upper section of resistance 54, contact 53 of relay 33, to main $L^1$. In case the car should continue to travel past the landing a sufficient distance to bring in stopping switch 83 the high-speed generator field would be brought in also to return the car to the landing. Switches 82 and 83 also act in place of switches 81 and 80 respectively when the car is descending.

In addition to the actions just described, the control mechanism is shown as comprising means for automatically opening the elevator door as the car starts in the process of leveling itself with the landing or as the control of the car is transferred from the slow-down switches to the stopping or leveling switches. By this means, the elevator car door may be caused to be opened at the instant the car becomes level with the landing, and thus accurate leveling of the car with the landing does not detract from the speed of service, and the elevator car may perform maximum service in passenger or freight handling. This is accomplished since upon closing of the automatic slow down relay 33, the slowing down of the car motor and the consequent closing of switch 80 the coil of an automatic door opening relay 90a is energized, closing a door opening circuit through contact of relay 90a through the air valve operating magnet.

When relay 46 operates as previously explained another parallel action is set up by the left hand contact of the relay 46 closing. Switch 140 in the car being closed line XH will be excited to $x$ potential. This closes a circuit to the third floor up-hall signal relay 100, leasing from line XH, left hand contact relay 46, coil relay 100, back contact of relay 29, contact of relay 18 to main Y. The down-hall signal relay 92 is not affected since back contact of 78 of the up-direction relay 28 being open breaks the circuit thereto. The three contacts of relay 100 being closed the center contact operates through the light cable to energize up light 3C at the third floor. The right contact shorts the coil of hall relay 96 so that it remains open. The short circuit is line XH, right hand contact relay 100, and line TT to main Y. The up push button 3a in the hall may then be pressed without having any effect and thus prevents other cars in the system being signalled to stop at the third floor. This effect continues until the car starts up again from the third floor.

The left hand contact of relay 100 energizes coil of hall signal master relay 141, the circuit being main Y, contact of relay 18, coil of relay 141, left hand contact of relay 100 to line XH. Relay 141 both assists in energizing the automatic slow down relay 33 and closes a retaining circuit for the hall signal relay 100 through resistances 142. The retaining circuit is line XH, the left hand contact relay 141 to resistance 142, to coil of relay 100, to back contact of relay 29, to contact of relay 18, to main Y.

In addition to the push button switches $1^f$ to $4^f$ respectively within the car, by which the car may be automatically stopped at any desired landing, there are provided at each landing an up and down push button switch or signalling means, by which means a car may be stopped by an awaiting passenger at such landing. The up switches for the landing are indicated by $1^a$, $2^a$, $3^a$ and $4^a$ respectively and the down switches are indicated by $1^b$ to $4^b$ respectively. There is also provided signalling means such as up and down lights, such as up-lights $1^c$ to $4^c$ and down lights $1^d$ to $4^d$ respectively for the respective landings for signalling when the car is to stop at such landing.

Assuming a passenger is awaiting in the hall of the second floor intending to go upward, the passenger will press up push button $2^a$, which brings in hall relay 95 of a series of up hall relays 94, 95, 96 and 97, one of which is provided for each floor, in case none of the other cars of the elevator system is already stopping at such floor. Hall relays $94^a$, $95^a$, $96^a$ and $97^a$ operate correspondingly for down hall signals. These relays have right hand contacts by which there is established self-holding circuits from main Y through one of the resistances 102, coil of relay 96 to main X. In this case, the car, on its upward travel by closing cam operated switch 41, will energize the relay 99, of the series of up hall signal relays 98, 99, 100 and 101, through its second winding in the same manner as effected by the car button. 90, 91, 92 and 93 indicate a series of down hall signal relays. This relay 99 then closes the circuit to light the up hall signal light $2^c$, closes the circuit through the master relay 141 so that it closes and short circuits relay 95. By this action the up hall push button cannot energize any other approaching car of the series of the elevator system until this short circuit for this up hall relay 95 is broken, hence no other car can be made to stop at this floor.

The closing of the hall signal master relay 141 causes the car to stop at the second floor during its upward travel through a similar sequence of operations as that described in stopping the car at the third floor through the car push button $3^f$. The closing of the door of the elevator car at the second floor after the stopping of the car at such floor as above described, breaks reset relay 18 which as above pointed out has its contact in all of the retaining circuits set up in previous slowing-down of the car, and hence the holding circuit for relay 95 and hall master relay 141 is broken and other cars may be signalled at this floor.

When the car descends in the elevator well, it will be readily seen that the throwing of the operator's switch 3 to the left closes the down-master relay 24 and hence the down direction switch 27 and the down-holding circuit relay 29 in place of the corresponding up-relays is caused when the operator's switch is moved to the right. There is thus set up a current through the high-speed generator field in a reverse direction to cause the elevator car to descend in the elevator well and there is also set up a retaining circuit for holding the down-direction relay 27 closed even after centering of the operator's switch. The car responds to car or landing signal push buttons in the same manner as the car would in its ascending trip, the different down-switches and relays operating in place of the corresponding up-switches and relays.

In case a push button in the car is incorrectly pushed in, the elevator car can be passed by this floor by pressing in button 49. This does not interfere with the hall signal however. At the top and bottom floors a contact is made by the door opening to energize a coil shown above the push buttons $1^f$, $2^f$, $3^f$ and $4^f$ to trip the latches on these buttons and they are reset. The top door contact is TD1 and the bottom door contact is BD1.

An important feature of the present invention, which is of great importance where the leveling action is to be accomplished by the same motor as normally drives the car, remains to be described. With commercial generators the voltage will not drop to zero after having been previously excited to high value. That is to say, that even with no field excitation, the residual magnetism in the generator field persists for such a period of time as to interfere with the leveling operations when there is no means provided to overcome this effect. The effect of this residual magnetism is to continue to drive the car ahead after the excitation of the field 9 ceases. Moreover, since in making short trips little residual magnetism is set up, this residual effect causes from 100–150 per cent variation in leveling speeds. Sometimes the residual voltage of the generator is bucking the leveling voltage and the car will not move.

The present invention includes a relay 150 to switch in means for compensating for this residual effect. Said relay 150 is provided with rear contact 151 which when opened inserts a resistance 152 in the circuit to the slow speed field 10 and thus cuts the excitation of the field to compensate for the residual voltage. It is obvious that in place of resistance 152 the contact 151 might cut in a small field to oppose the field 10 and thus compensate for this residual effect. To operate the relay 150 the up relays 77 and $129^a$ which bring in the decelerating resistances 54 are provided with contacts 153 and 154 respectively so that whenever either of relays 77 and 129 is closed, a circuit is closed from main $L^1$, contact 53 of relay 33, through contact 153 or 154, and contact 155 of relay 22, coil of relay 150, contact 61 of the slow down relay 33 to $L^2$. The relay 150 thus inserts the compensating resistance in the circuit for the slow speed field 10. The relay 150 has a contact 156 for closing a self-holding circuit through its coil which holding circuit is only broken by opening of relay 22 and thus continues until the car is stopped at the landing. If the car passes the landing the resistance is cut out to provide a high excitation to return the car to the landing. There is thus provided a constant leveling speed whether a car is approaching a floor or returning to the floor. Moreover this compensating resistance 152 is inserted in approaching a landing only when the car has been accelerated to full speed so that a high residual is set up in the generator field, as will be later apparent from the description of certain means employed to accomplish this result. It is apparent that in place of operating the relay 150 through relays 77 and 129[a], the relay 150 might be operated to effect equivalent results through a counter-electromotive force relay connected with field of the drive motor 5 to operate to close relay 150 only when the motor field had built up to certain values corresponding to the development of high residual fields in the generator.

In the preceding description of the operation of the elevator, the action has been described with reference to the stopping of the car after it has made such a period of travel to have accelerated to full speed. If the elevator was made to stop at each adjacent floor in its travel it would not normally be accelerated to full speed and hence would (one) not require such a long period to decelerate and (two) not develop a high residual voltage in the generator field. For example if an elevator is traveling 600 feet per minute, 8 feet should be allowed for the elevator to slow down and stop properly, but when traveling 400 feet per minute only 4 feet are required.

In order to take care of these conditions a controlling relay is provided to regulate the slow down distance. We therefore provide a counter-electromotive force relay 156$_a$ connected across the generator voltage. This relay 156$_a$ controls a contact 157 which when closed shorts the upper portion of resistance 54 independently of relays 77 and 129[a] so that unless contact 157 is open, the decelerating period is reduced. The relay 156$_a$ does not operate until the voltage of the generator has built up to high value and hence in such cases the shorter decelerating period is employed. When the generator voltage raises to a high value corresponding to a high rate of travel of the car the relay 156$_a$ opens contact 157 and hence all resistance 54 is inserted as previously explained.

The elevator car mechanism thus described is adapted for automatically bringing a high-speed elevator car to an accurate level with each landing automatically without loss of time. Moreover, this is accomplished in the preferred form of the invention without the necessity of hatchway switches and entirely through the use of a floor controller operating merely to control the customary single hoisting motor of the elevator car mechanism.

The apparatus of the present invention is so constructed that any desired number of elevator cars may be operated in a bank and each elevator of the bank will respond to the hall signal switches *1a*, *1b*, *2a*, *2b*, *3a*, *3b*, *4a* and *4b*. To connect a plurality of elevators together in an elevator bank, each additional elevator car may be constructed and provided with a separate mechanism exactly identical with that shown in Figures 1 to 4 inclusive, except that only one set of hall signal switches need be used, no matter how many cars are included in the system. The sixteen top horizontal lines in Figures 3 and 4, in case of a plurality of elevator cars, are connected to corresponding lines of each additional car operating mechanism. No other connection is required between the car operating mechanism of individual cars than the connection of corresponding lines to the sixteen horizontal top lines of Figures 3 and 4. When so connected, a hall push button such as *1a* to *4a* inclusive or *1b* to *4b* inclusive, will stop only one car, since, as previously pointed out, the stopping signals are cut out when the first car stops at a landing. The circuits for this purpose have previously been described.

When a plurality of elevator cars are placed in a bank by this means, only one set of hall signals and set of hall lights will be present at each elevator landing. The only parts omitted in duplicating the construction for a plurality of cars in this way, are the parts left of line A—A of Figure 3. It may be desired in placing a plurality of elevator cars in a bank, not to omit the hall signals and lights shown, but in place thereof to provide a series of up and down buttons and lights at each landing for each elevator car in the bank or, for example, in the bank of four elevator cars, it may be desirable to provide two sets of push buttons. In such case, the additional elevator cars are constructed and include each and every part of the mechanism illustrated in Figures 3 and 4, and have the common lines, those sixteen horizontal lines shown at the top of Figures 3 and 4, connected with each like car in the bank.

Figure 4:
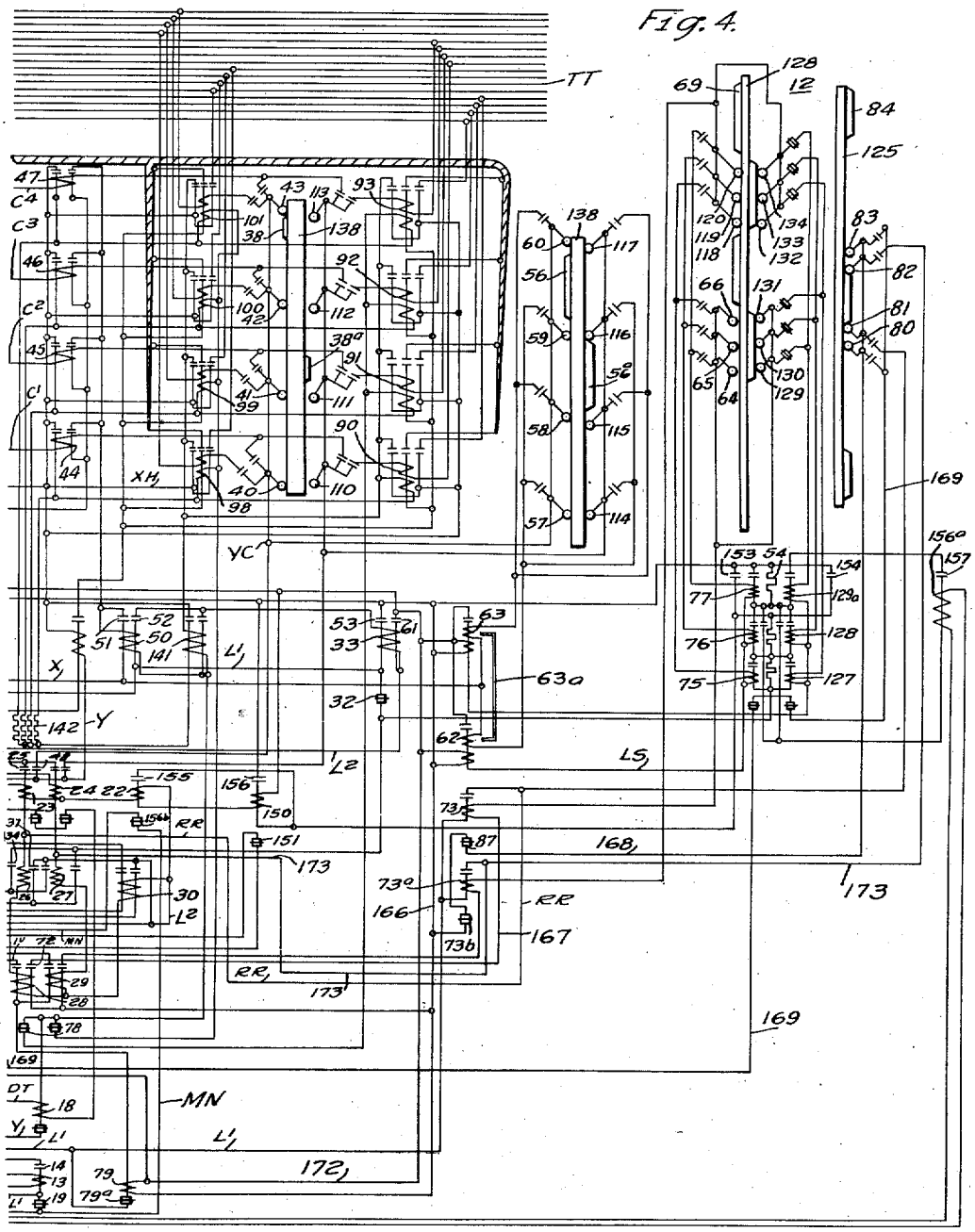
Figure 5:
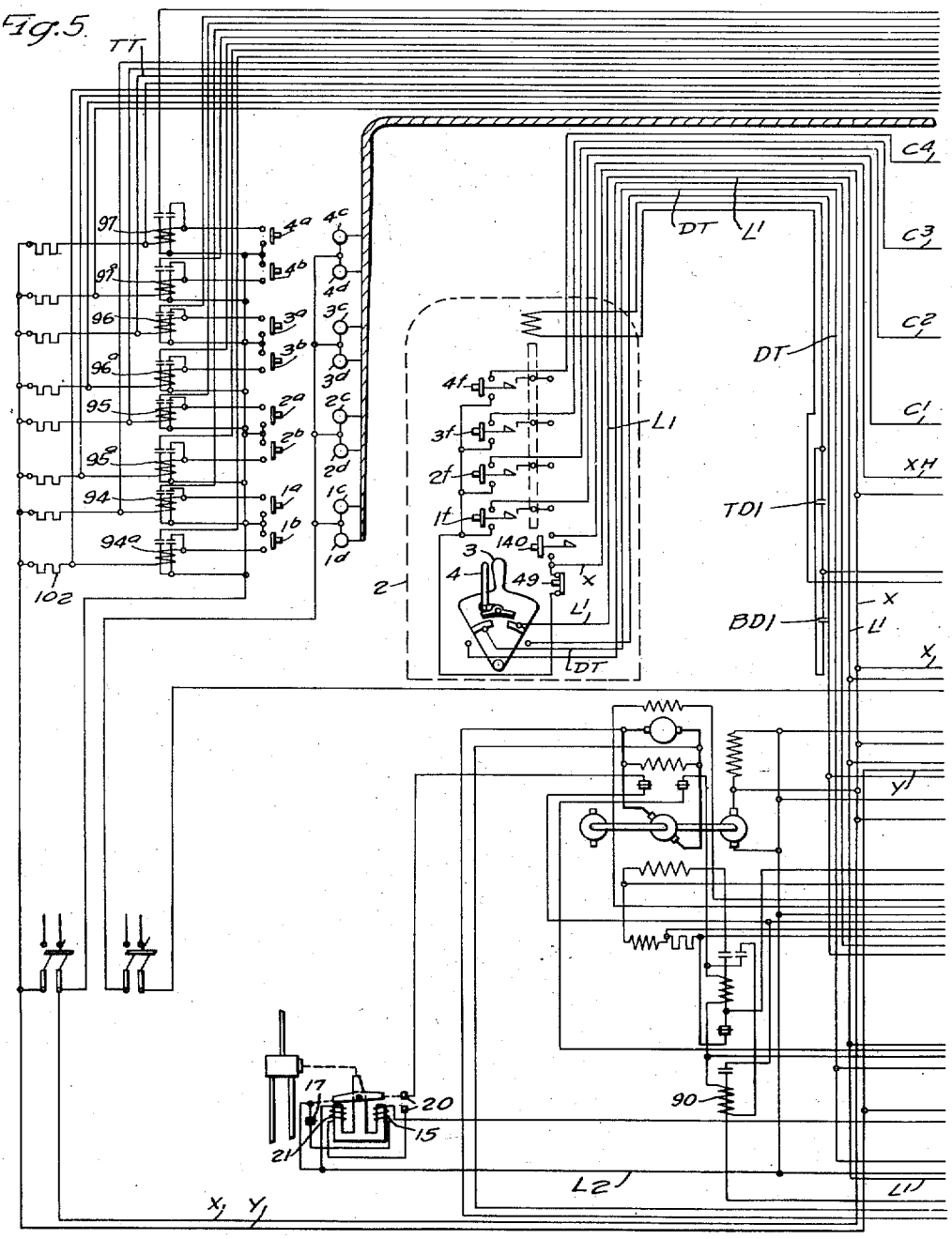
Figs. 5 and 6 are drawings similar to Figs. 3 and 4 of electrical diagrams for a second car in the system.
Figure 6:
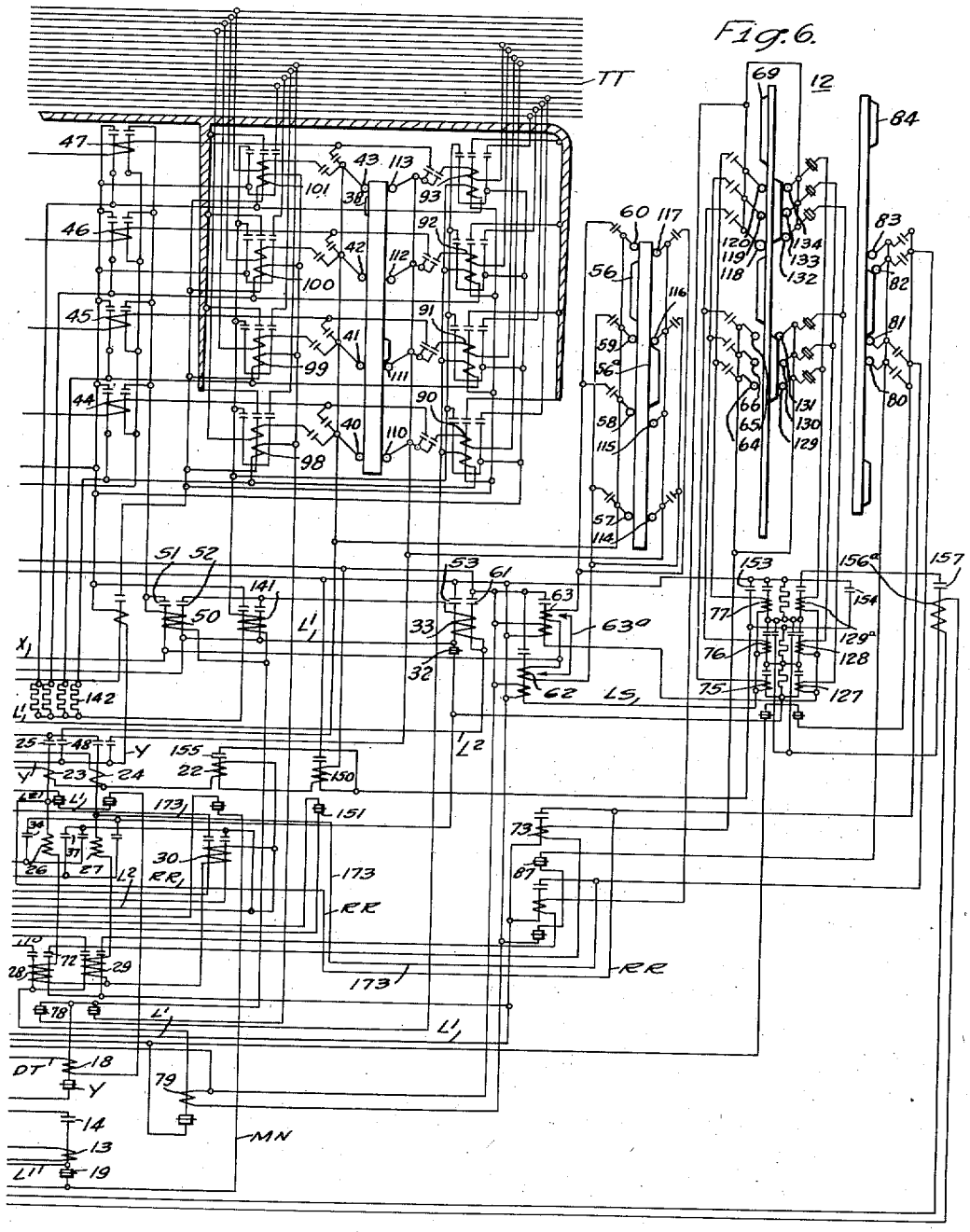

In Figures 5 and 6 we have shown drawings of electrical connections suitable for a second elevator car in the bank. Inasmuch as the cars may be of identical construction, the parts are shown identical with Figures 3 and 4, respectively, and the same indicating characters used and applied to the corresponding parts of each elevator car mechanism. All of the operations described as to the first car can therefore be traced on the drawings of the second car.

The elevator cars are connected by connecting respectively the top 16 lines of Figures 5 and 6 with the top 16 respective lines of Figures 3 and 4. Therefore, when any of these top 16 lines is energized by the pressing of any of the hall buttons, both of the cars or any of the cars in the series are signaled. Inasmuch as the circuits described for shorting out the signal operate when any car stops at the landing, only one car will stop at the landing.

It is to be understood that various of the features of the invention may be employed without employing all of the features of the invention and that various modifications and changes in the details of the elevator mechanisms herein described may be made without departing from the spirit of the invention, and the invention includes all such modifications, changes and substitution of equivalents as fall within the appended claims.

We claim as our invention:

1. In an elevator, the combination with an electric hoisting motor and an elevator car, of an operator's switch within the car, a direction relay, a holding circuit for said relay adapted to close upon operation of the operator's switch for starting the car, a holding circuit transferring relay operated to open said first holding circuit and close a second holding circuit for the direction relay upon slowing of the elevator car, and a car stopping and leveling mechanism provided with a cam operated switch for closing a third holding circuit for the direction relay until the car has stopped.

2. In an elevator, the combination with an electric hoisting motor, and an elevator car, of an operator's switch within the car, a direction relay, a holding circuit for said relay adapted to be closed upon operation of the operator's switch for starting the car, means for automatically slowing the car upon approach of the car within a predetermined distance of a landing, a relay operated to open said first holding circuit and close a second holding circuit for the direction relay during said slowing of the elevator car, and a car leveling mechanism provided with a cam operated switch for maintaining a third holding circuit for the direction relay during leveling of the car.

3. In an elevator, the combination with an electric hoisting motor, and an elevator car, of an automatic car slowing mechanism, an automatic car leveling mechanism, an operator's switch within the car for starting the car, a direction relay, a holding circuit for said relay adapted to be closed upon operation of the operator's switch for starting the car, a relay operated by the car slowing mechanism to open said first holding circuit and closing a second holding circuit during slowing of the car, and a second relay operated by the operation of the leveling mechanism to open said second holding circuit and closing a third holding circuit for the direction relay during leveling of the car and to open said third holding circuit when the car is leveled.

4. In an elevator, the combination with an electric hoisting motor and an elevator car, an operator's switch within the car, a direction relay for controlling the current to run the car, a relay closed by operation of the operator's switch to automatically maintain said direction relay closed, means as the car approaches within a predetermined distance of a landing for opening said holding circuit and transferring the control of the direction switches to an automatic slow down mechanism, comprising cam operated switches for progressively decreasing the power to the hoisting motor, and means for thereafter transferring the control of the direction switches to a leveling mechanism which maintains a holding circuit for the direction switches during leveling of the car and breaks the holding circuit to stop the car as and when the car becomes leveled with the landing.

5. In an electric elevator, the combination with an elevator hoisting motor, and an elevator car, of an operator's switch within the car, a direction relay operated thereby to start the car, a floor controller operatively connected with the car and provided with a switch mechanism to automatically slow down the car as the car approaches the landing and provided with switching mechanism for accurately leveling the car with a landing and for the opening of said direction relay, and a plurality of selective operated switches within the car for setting the floor controller to slow and stop the car at any desired selected landing.

6. In an electric elevator, the combination with an elevator hoisting motor, and an elevator car, of an operator's switch within the car, a direction relay operated thereby to start the car, a floor controller operatively connected with the car and provided with switching mechanism for automatically decelerating the car as it approaches a landing, and with switching mechanism for automatically leveling the car accurately with the landing and opening such direction relay, a plurality of selectively operated switches within the car for setting the decelerating switching mechanism of the floor controller to stop the car at any desired selected landing, and hall switching devices operative independent of the operator within the car for conditioning the door controller to stop the car at the landings.

7. In an electric elevator, the combination with a car and an electric hoisting motor, of controller means therefor, comprising a car leveling switching mechanism, and an automaticc car slowing switching mechanism, said car slowing switching mechanism comprises two sets of switching devices corresponding to alternate landings, and a relay device for transferring from one set of switch devices to the other set to energize the correct set of switching devices for the landing being stopped at, whereby switch devices for automatically slowing the car down as it approaches adjacent landings are prevented from interfering.

8. In an electric elevator, the combination with a car and an electric hoisting motor, of controlled mechanism therefor, comprising switching mechanism for accurately leveling the car with the landing, switching mechanism for automatically decelerating a car as it passes within fixed distances of the landings, said decelerating switching mechanism comprising two sets of switching devices arranged so that adjacent landings are not served by the same set of decelerating switching devices, and relay mechanism for energizing the correct set of decelerating switching mechanism as the car approaches the landings.

9. In an electric elevator, the combination with a car and an electric hoisting motor, of a switching mechanism for accurately leveling the car with the landings, and an automatic switching mechanism for decelerating the car as it approaches the landing, said decelerating switching mechanism including a drum driven by the car provided with a plurality of cam operated switches, said cam operated switches being arranged so that switches of different sets serve adjacent floors, and relay mechanism for energizing the correct set of cam operated switches as the car approaches the landings.

10. In an electric elevator, the combination with an elevator car, of electric control mechanism therefor, comprising an operator's switch within the car, a latch for holding the operator's switch in the neutral position, and electrically controlled door opening mechanism, a switch operated by release of the latch for closing the circuit through the door opening mechanism for closing the door, and operated by latching the latch to close another circuit for opening the door, switching mechanism for accurately leveling the car with a landing, and a relay device for closing a circuit through the door controlling mechanism for automatically opening the door during the operation of the car leveling switching mechanism.

11. In an electric elevator, the combination with an elevator car, of electric control mechanism therefor, comprising a car leveling switching mechanism, a plurality of car slowing switch mechanisms, hall signalling means, car signal means, a master switching mechanism responsive to either said hall signalling means or said car signalling means for energizing said car slowing switching mechanisms, and a further switching mechanism operative to prevent energizing of part of said car slowing switch mechanisms to prevent interference between slowing switch mechanisms for different floors.

12. In an electric elevator, the combination with an elevator car, of electric control mechanism therefor, comprising a car leveling switching mechanism, a plurality of car decelerating switching mechanisms, and a master switching mechanism, including switches interlocked with said plurality of car decelerating switching mechanism to set in action different decelerating switching mechanisms in the operations of stopping the car at different floors.

13. In an electric elevator, the combination with an elevator car, of electric control mechanism therefor, comprising a car leveling switching mechanism, a car decelerating switching mechanism, a master switching mechanism operative automatically in response to signal impulses to set in action said decelerating and leveling switching mechanisms as the car passes fixed points in approaching a landing, means for transmitting signalling impulses to said master switching mechanism, a holding circuit to maintain said signals at the master switching mechanism and including means to prevent further like signalling impulses being transmitted, and means operative to break said holding circuit at will.

MILTON BARUCH.
RAY E. DE CAMP.
CRANFORD P. WALKER.